(12) United States Patent
Tsai

(10) Patent No.: US 10,880,329 B1
(45) Date of Patent: Dec. 29, 2020

(54) METHOD FOR PREVENTING DISTRIBUTED DENIAL OF SERVICE ATTACK AND RELATED EQUIPMENT

(71) Applicant: NANNING FUGUI PRECISION INDUSTRIAL CO., LTD., Nanning (CN)

(72) Inventor: Cheng-Yen Tsai, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days.

(21) Appl. No.: 16/550,567

(22) Filed: Aug. 26, 2019

(51) Int. Cl.
| H04L 29/06 | (2006.01) |
| H04L 29/08 | (2006.01) |
| H04L 12/24 | (2006.01) |
| H04L 12/26 | (2006.01) |

(52) U.S. Cl.
CPC ........ H04L 63/1458 (2013.01); H04L 41/069 (2013.01); H04L 43/16 (2013.01); H04L 63/1416 (2013.01); H04L 63/1425 (2013.01); H04L 63/1433 (2013.01); H04L 63/20 (2013.01); H04L 67/36 (2013.01); *H04L 2463/144* (2013.01)

(58) Field of Classification Search
CPC .............. H04L 63/1458; H04L 63/145; H04L 63/1441; H04L 63/1466
See application file for complete search history.

(56) References Cited

U.S. PATENT DOCUMENTS

| 9,210,180 B2 * | 12/2015 | Zisapel | H04L 63/1441 |
| 2017/0026387 A1 * | 1/2017 | Vissamsetty | H04L 63/1466 |
| 2018/0013787 A1 * | 1/2018 | Jiang | H04L 43/16 |
| 2019/0173901 A1 * | 6/2019 | Mi | H04L 63/1441 |

* cited by examiner

*Primary Examiner* — Esther B. Henderson
(74) *Attorney, Agent, or Firm* — ScienBiziP, P.C.

(57) ABSTRACT

A method for preventing denial of service attacks which are distributed attacks is applied in a target service provider server, a platform server, and a botnet service provider server. The target service provider server determines a first SDN controller according to an attack protection request, and issues a first flow rule. The target service provider server directs data flow of a network equipment to a first cleaning center and controls the first cleaning center to identify the attacking or malicious element in the data flow according to the first flow rule. The platform server receives the attacking element in the data flow sent by the target service provider server, and regards the same as malicious traffic. The platform server generates an attack report, and sends the attack report to the botnet service provider server to notify the botnet service provider server to clean or filter out the malicious traffic.

14 Claims, 3 Drawing Sheets

METHOD FOR PREVENTING DISTRIBUTED DENIAL OF SERVICE ATTACK AND RELATED EQUIPMENT

FIELD

The subject matter herein generally relates to computer communications.

BACKGROUND

Distributed denial of service (DDoS) attacks means multiple computers being used as attack platforms with the help of client/appliance. When DDoS attacks are launched on one or more target devices, the power of denial of service attacks is strongly increased. In the existing art, traffic of distributed denial of service attack is difficult to detect due to small amounts of traffic when the attack is distributed.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
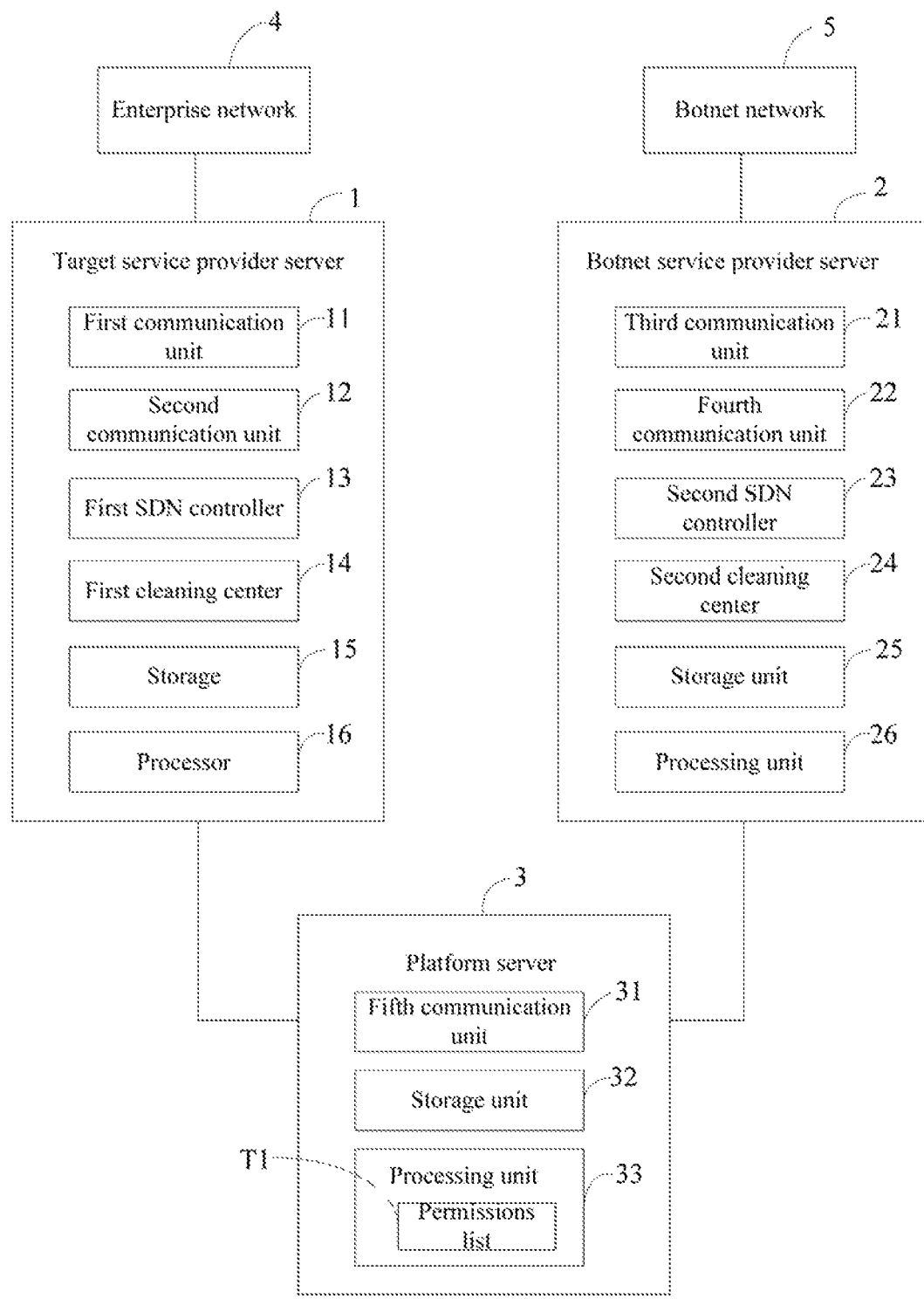
FIG. 1 is a block diagram of an embodiment of a running environment of a method for preventing distributed denial of service attack.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates a running environment of a method for preventing distributed denial of service attack. The method is applied in an environment composed of a target service provider server 1, at least one botnet service provider server 2, and a platform server 3. The target service provider server 1 is connected to an enterprise network 4. The botnet service provider server 23 is connected to a botnet network 5. The target service provider server 1 and the botnet service provider server 23 communicate with the platform server 3. In this embodiment, the platform server 3 can be a single platform server, platform server cluster, or cloud platform server.

In one embodiment, the target service provider server 1 includes a first communication unit 11, a second communication unit 12, at least one first SDN (Software Defined Network) controller 13, a first cleaning center 14, a storage 15, and a processor 16. The first communication unit 11 communicates with the platform server 3. The second communication unit 12 communicates with the enterprise network 4. In this embodiment, the first communication unit 11 and the second communication unit 12 can be WIFI communication module or 3G/4G communication module. The first SDN controller 13 can control the forwarding rules in the enterprise network 4. In this embodiment, the number of the first SDN controllers 13 is more than one. The first cleaning center 14 is used to clean the attacking or malicious traffic in the enterprise network 4 to redirect the attacking or malicious traffic from a path of a original network (namely enterprise network 4) to purification center or destination for the identification and deletion or deactivating of the attacking or malicious traffic.

In the embodiment, the processor 16 can be a central processing unit, or a common processor, a digital signal processor, a dedicated integrated circuit, ready-made programmable gate arrays or other programmable logic devices, discrete door or transistor logic devices, discrete hardware components, and so on. In another embodiment, the processor 16 can be a microprocessor or any conventional processor. The processor 16 can also be a control center of the target service provider server 1, using various interfaces and lines to connect the various parts of the target service provider server 1.

The storage 15 stores data of the target service provider server 1. In at least one exemplary embodiment, the storage 15 can include various types of non-transitory computer-readable storage mediums. For example, the storage 15 can be an internal storage system of the target service provider server 1, such as a flash memory, a random access memory (RAM) for temporary storage of information, and/or a read-only memory (ROM) for permanent storage of information. In another embodiment, the storage 15 can also be an external storage system, such as a hard disk, a storage card, or a data storage medium.

In one embodiment, the botnet service provider server 2 includes a third communication unit 21, a fourth communication unit 22, at least one second SDN controller 23, a second cleaning center 24, a storage unit 15 and a processing unit 16. The third communication unit 21 communicates with the platform server 3. The fourth communication unit 22 communicates with the botnet network 5 In this embodiment, the third communication unit 21 and the fourth communication unit 22 can be WIFI communication modules or 3G/4G communication modules. The second SDN controller 23 can control the forwarding rules in the botnet network 5. In this embodiment, the number of second SDN controllers 23 is more than one. The second cleaning center 24 is used to clean the attacking or malicious traffic in the botnet network 5, to redirect the such traffic from a path of the botnet network 5 to purification center or destination for the identification and treatment of such traffic.

In the embodiment, the processing unit 26 can be a central processing unit, or a common processor, a digital signal processor, a dedicated integrated circuit, ready-made programmable gate arrays or other programmable logic devices, discrete door or transistor logic devices, discrete hardware components, and so on. In another embodiment, the processing unit 26 can be a microprocessor or any conventional processor. The processing unit 26 can also be a control center of the botnet service provider server 2, using interfaces and lines to connect the parts of the botnet service provider server 2. The storage unit 25 is used to store data of the botnet service provider server 2. In at least one exemplary embodiment, the storage unit 25 can include non-transitory computer-readable storage mediums. For example, the storage unit 25 can be an internal storage system of the botnet service provider server 2, such as a flash memory, a random access memory (RAM) for temporary storage of information, and/or a read-only memory (ROM) for permanent storage of information. In another embodiment, the storage unit 25 can also be an external storage system, such as a hard disk, a storage card, or a data storage medium.

In one embodiment, the platform server 3 includes a fifth communication unit 31, a storage unit 32, and a processing unit 33. The fifth communication unit 31 communicates with the target service provider server 1 and the botnet service provider server 2. In the embodiment, the fifth communication unit 31 can be WIFI communication module or 3G/4G communication module. In the embodiment, the processing unit 33 can be a central processing unit, or a common processor, a digital signal processor, a dedicated integrated circuit, ready-made programmable logic devices, discrete door or transistor logic devices, discrete hardware components, and so on. In another embodiment, the processing unit 33 can be a microprocessor or any conventional processor. In at least one exemplary embodiment, the storage unit 32 can include various types of non-transitory computer-readable storage mediums. For example, the storage unit 33 can be an internal storage system of the platform server 3, such as a flash memory, a random access memory (RAM) for temporary storage of information, and/or a read-only memory (ROM) for permanent storage of information. In another embodiment, the storage unit 33 can also be an external storage system, such as a hard disk, a storage card, or a data storage medium.

Figure 2:
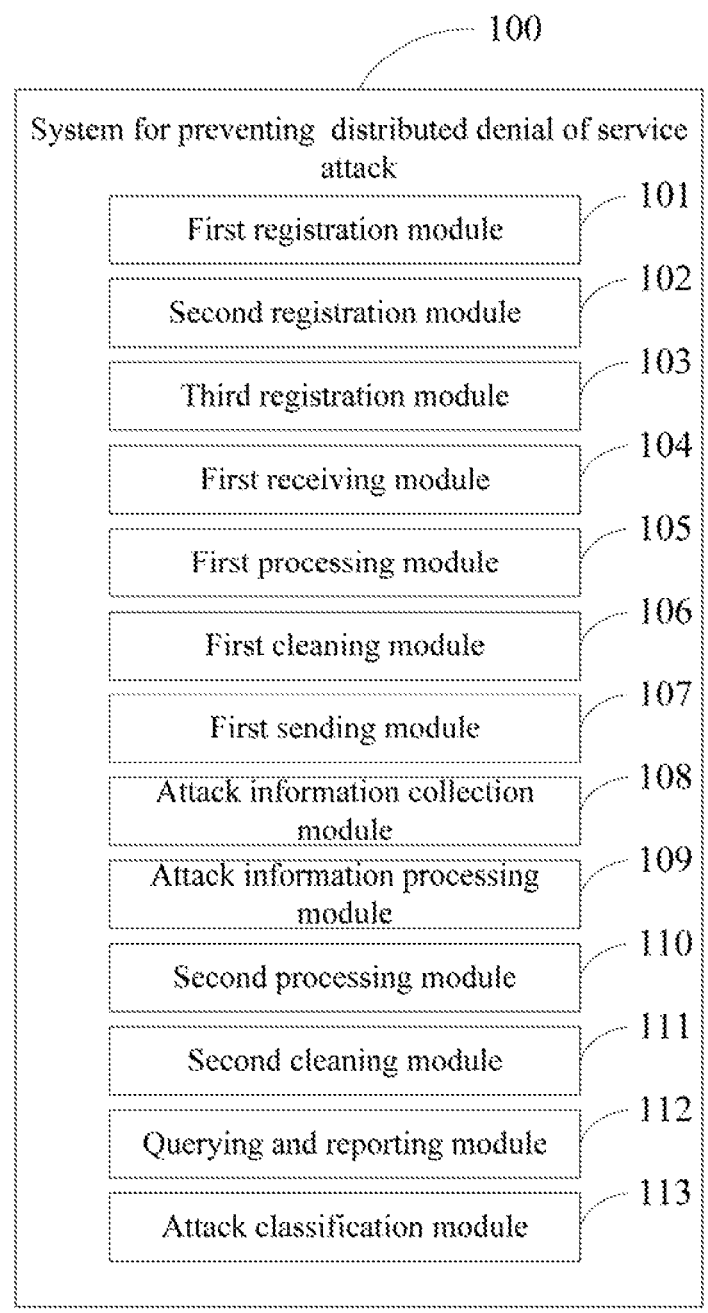
FIG. 2 is a block diagram of an embodiment of a system for preventing distributed denial of service attack.

FIG. 2 illustrates system 100 for preventing distributed denial of service attack. In the embodiment, the system 100 includes one or more modules, which are running in the target service provider server 1, botnet service provider server 2, and platform server 3. The system 100 includes a first registration module 101, a second registration module 102, a third registration module 103, a first receiving module 104, a first processing module 105, a first cleaning module 106, a first sending module 107, an attack information collection module 108, an attack information processing module 109, a second processing module 110, a second cleaning module 111, a querying and reporting module 112, and an attack classification module 113. The modules 101-113 of the system 100 can be collections of software instructions. In present embodiment, the first registration module 101, the first receiving module 104, the first processing module 105, the first cleaning module 106, the first sending module 107, and the querying and reporting module 112 are stored in the storage 15 of the target service provider server 1 and executed by the processor 16 of the target service provider server 1. The second registration module 102, the second processing module 110, and the second cleaning module 111 are stored in the storage unit 25 of the botnet service provider server 2 and executed by the processing unit 26 of the botnet service provider server 2. The third registration module 103, the attack information collection module 108, the attack information processing module 109, and the attack classification module 113 are stored in the storage unit 32 of the platform server 3 and executed by the processing unit 33 of the platform server 3. In another embodiment, the first registration module 101, the first receiving module 104, the first processing module 105, the first cleaning module 106, the first sending module 107, and the querying and reporting module 112 are program segments or code in the processor 16 of the target service provider server 1. The second registration module 102, the second processing module 110, and the second cleaning module 111 are program segments or code in the processing unit 26 of the botnet service provider server 2. The third registration module 103, the attack information collection module 108, the attack information processing module 109, and the attack classification module 113 are program segments or code in the processing unit 33 of the platform server 3.

The first registration module 101, which is applied in the target service provider server 1, sends a registration signal carrying an identity of the target service provider server 1 to the platform server 3 to register the target service provider server 1 in the platform server 3 according to the identity of the target service provider server 1.

In the embodiment, the first registration module 101 sends the registration signal carrying the identity of the target service provider server 1 to the platform server 3 by the first communication unit 11. The identity of the target service provider server 1 can be an unique numbering of the target service provider server 1, and the numbering can be composed of characters such as letters or numbers.

The second registration module 102, which is applied in the botnet service provider server 2, sends the registration signal carrying the identity of the botnet service provider server 2 to the platform server 3 to register the botnet service provider server 2 in the platform server 3 according to the identity given.

In the embodiment, the second registration module 102 sends the registration signal carrying the identity of the botnet service provider server 2 to the platform server 3 through the third communication unit 21. In the embodiment, the identity of the botnet network service provider server 2 is the unique numbering for the botnet service provider server 2.

The third registration module 103, which is applied in the platform server 3, receives the first registration signal sent by the target service provider server 1, registers the target service provider server 1 according to the identity of the target service provider server 1 contained in the first registration signal and grants permission to the target service provider server 1 to exchange the attack information. The third registration module 103 also receives the second registration signal sent by the botnet network service provider server 2, and registers the botnet service provider server 2 according to the identity of the botnet service provider server 2 contained in the second registration signal. Permission is granted to the botnet service provider server 2 to exchange the attack information.

Specifically, the third registration module 103 registers the target service provider server 1 or the botnet service provider server 2 in the permissions list T1 according to the identity of the target service provider server 1 or the identity of the botnet service provider server 2, to grant permissions to the target service provider server 1 or the botnet service provider server 2 to exchange the attack information. In the embodiment, the permissions list T1 is stored in the platform server 3.

The first receive module 104, which is applied in the target service provider server 1, receives an attack protection request sent by the enterprise network 4.

In the embodiment, when the enterprise network 4 is attacked by a distributed denial of service manner and an internal protection device of the enterprise network 4 is overloaded, an attack protection request generated by the enterprise network 4 is sent to the target service provider server 1 for assistance.

The first processing module 105, which is applied in the target service provider server 1, determines the associated first SDN controller 13 according to a source of the attack protection request. The module 105 issues a first redirect notification to the first SDN controller 13, and controls the first SDN controller 13 to convert the first redirected notification into a first flow rule. In one embodiment, the first flow rule is a data forwarding rule, which directs a data flow in the network equipment in enterprise network 4 to the first cleaning center 14.

In one embodiment, different first SDN controllers 13 can be responsible for controlling the data forwarding of different target service provider servers 1. When the first processing module 105 receives the attack protection request, the first processing module 105 determines upon one first SDN controller 13, associated with the target service provider server 1 according to the source of the attack protection request, to control the data forwarding of the target service provider server 1.

The first cleaning module 106, which is applied in the target service provider server 1, is used to direct the data flow of the network equipment in the enterprise network 4 to the first cleaning center 14 and to control the first cleaning center 14 to identify the attack flow from the data flow according to the first flow rule.

In one embodiment, the first cleaning module 106 identifies and strips the attack flow from the data flow, restores a legal flow from the data flow, and return the legal flow to the network device of the enterprise network 4 through the first cleaning center 14.

The first send module 107, which is applied to the target service provider server 1, sends the identified attack flow to the platform server 3.

The attack information collection module 108, which is applied in the platform server 3, receives the attack flow sent by the target service provider server 1 and regards the received attack flow as malicious traffic.

The attack information processing module 109, which is applied in the platform server 3, determines upon the botnet service provider server 2 containing the malicious traffic in the permission list T1 stored in the platform server 3, and regards the botnet service provider server 2 as the target botnet service provider server. An attack report is generated, and sent to the target botnet service provider server as a notification to the target botnet service provider server that the malicious traffic must be cleaned or filtered.

The second processing module 110, which is applied in the botnet network service provider server 2, receives the attack report sent by the platform server 3, determines which second SDN controller 23 is associated with the botnet service provider server 2 according to the attack report, and issues a second redirect notification to the associated second SDN controller 23. The associated second SDN controller 23 converts the second redirect notification into a second flow rule. In one embodiment, the second flow rule is a data forwarding rule, which directs the data flow of the network device in botnet network 5 to the second cleaning center 24.

In one embodiment, different second SDN controllers 23 can be responsible for controlling the data forwarding of different botnet service provider servers 2. When the second processing module 110 receives the attack report sent by the platform server 3, the second processing module 110 determines upon the second SDN controller 23 associated with the botnet network service provider server 2 to control the data forwarding of the target service provider server 1.

The second cleaning module 111, which is applied in the botnet service provider server 2, directs the data flow of the network device in the botnet service provider server 2 to the second cleaning center 24 according to the second flow rule, and controls the second cleaning center 24 to distinguish and identify the attack flow from the data flow.

In one embodiment, the second cleaning module 111 directs the data flow of the network device in the botnet service provider server 2 to the second cleaning center 24 according to the second flow rule. The module 111 identifies and strips the attack flow from the data flow of the network device in the botnet service provider server 2, restores a legal flow from the data flow, and returns the legalized flow to the network device of the botnet network 5 through the first cleaning center 14.

The querying and reporting module 112, applied in the target service provider server 1, queries the attack flow of the botnet network service provider 2 by the first SDN controller 13 for each preset cycle, and sends the attack flow to the platform server 3. In one embodiment, the preset period can be set according to user need.

The attack classification module 113, applied in the platform server 3, classifies the attack flow according to quantity of flow sent by the target service provider server 1. Thereby, a classification level of the flow is obtained, and the classification level of the attack traffic is sent to the botnet service provider server 2.

The botnet service provider server 2 also receives the classification level of the attack traffic sent by the platform server 3 and cleans the attack flow according to the classification level of the attack flow.

In one embodiment, the attack classification module 113 defines the quantity of flow of the attack above a first preset threshold as a first hazard level, above a second preset threshold as the second hazard level, and above a third preset threshold as a third hazard level. In one embodiment, the first preset threshold is 100 Gbps, the second preset threshold is 50 Gbps, and the third preset threshold is 25 Gbps.

The second cleaning module 111 also receives the classification level of the attack flow sent by the platform server 3, and cleans the attack flow according to the classification level.

Specifically, the second cleaning module 111 applies the filter against the attack flow in different intensities according to the classification level of the attack flow. In one embodiment, the second cleaning module 111 can apply the filter in different strengths or intensities by reducing the number of virtual machines in the second cleaning center 24 or by reducing the filtration conditions.

In another embodiment, the second cleaning module 111 adjusts the number of the second flow rule according to the classification level of the attack flow or reduces the network devices that the second SDN controller 23 is responsible for in the botnet service provider server 2, according to the classification level of the attack flow.

Figure 3:
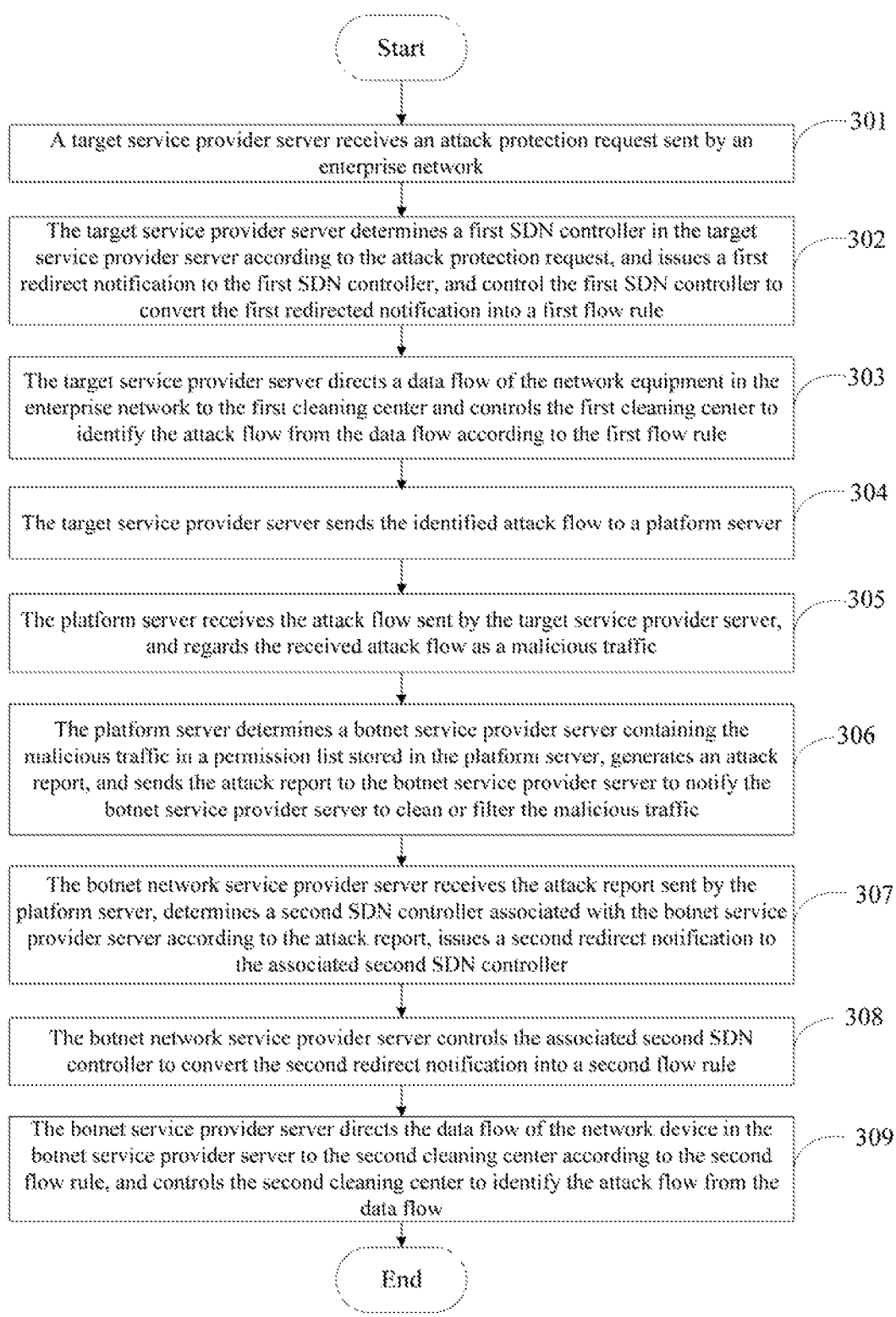
FIG. 3 is a flowchart of an embodiment of a method for preventing distributed denial of service attack.

FIG. 5 illustrates a flowchart of an embodiment of a method for preventing distributed denial of service attacks. The method is provided by way of example, as there are a variety of ways to carry out the method. The method described below can be carried out using the configurations illustrated in FIGS. 1-2, for example, and various elements of these figures are referenced in explaining the example method. Each block shown in FIG. 3 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 301.

At block 301, a target service provider server receives an attack protection request sent by an enterprise network.

In the embodiment, when the enterprise network is attacked by a distributed denial of service manner and an internal protection device of the enterprise network is overloaded, the attack protection request generated by the enterprise network is sent to the target service provider server to notify the target service provider server to assist in the processing of the distributed denial of service attack.

At block 302, the target service provider server determines a first SDN controller in the target service provider server according to the attack protection request, and issues a first redirect notification to the first SDN controller, and control the first SDN controller to convert the first redirected notification into a first flow rule. In one embodiment, the first flow rule is a data forwarding rule, which directs a data flow in the network equipment in the enterprise network to a first cleaning center in the target service provider server.

In one embodiment, different first SDN controller can be responsible for controlling the data forwarding of different target service provider servers. When the target service provider server receives the attack protection request, the target service provider server determines one first SDN controller, associated with the target service provider server according to the source of the attack protection request, to control the data forwarding of the target service provider server.

At block 303, the target service provider server directs a data flow of the network equipment in the enterprise network to the first cleaning center and controls the first cleaning center to identify the attack flow from the data flow according to the first flow rule.

In one embodiment, the target service provider server identifies and strips the attack flow from the data flow, restores a legal flow from the data flow, and returns the legal flow to the network device of the enterprise network by the first cleaning center.

At block 304, the target service provider server sends the identified attack flow to a platform server.

At block 305, the platform server receives the attack flow sent by the target service provider server, and regards the received attack flow as a malicious traffic.

At block 306, the platform server determines a botnet service provider server containing the malicious traffic in a permission list stored in the platform server, generates an attack report, and sends the attack report to the botnet service provider server to notify the botnet service provider server to clean or filter the malicious traffic.

At block 307, the botnet network service provider server receives the attack report sent by the platform server, determines which second SDN controller is associated with the botnet service provider server according to the attack report, and issues a second redirect notification to the associated second SDN controller.

At block 308, the botnet network service provider server controls the associated second SDN controller to convert the second redirect notification into a second flow rule. In one embodiment, the second flow rule is a data forwarding rule, which directs the data flow of the network device in a botnet network to the second cleaning center.

In one embodiment, different second SDN controller can be responsible for controlling the data forwarding of different botnet service provider server, and when the botnet network service provider server receives the attack report sent by the platform server, the botnet network service provider server determines which second SDN controller is associated with the botnet network service provider server to control the data forwarding of the target service provider server.

At block 309, the botnet service provider server directs the data flow of the network device in the botnet service provider server to the second cleaning center according to the second flow rule, and controls the second cleaning center to distinguish and identify the attack flow from the data flow.

In one embodiment, the botnet service provider server directs the data flow of the network device in the botnet service provider server to the second cleaning center according to the second flow rule, identifies and strips the attack flow from the data flow of the network device in the botnet service provider server, restores a legal flow from the data flow, and returns the legal flow to the network device of the botnet network through the first cleaning center.

In one embodiment, the method further includes:

a) the target service provider server queries the attack flow of the botnet network service provider by the first SDN controller for each preset cycle, and sends the attack flow to the platform server.

b) the platform server classifies the attack flow according to quantity of the attack flow sent by the target service provider server to obtain a classification level of the attack flow, and sends the classification level of the attack traffic to the botnet service provider server.

c) the botnet service provider server receives the classification level of the attack flow sent by the platform server, and cleans the attack flow according to the classification level of the attack flow.

In one embodiment, the platform server defines the attack flow above a first preset threshold as a first hazard level, defines the attack flow above a second preset threshold as a second hazard level, and defines the attack flow above a third preset threshold as a third hazard level. In one embodiment, the first preset threshold is 100 Gbps, the second preset threshold is 50 Gbps, and the third preset threshold is 25 Gbps.

Specifically, the botnet service provider server makes the attack flow filter in different intensity according to the classification level of the attack flow. In one embodiment, the botnet service provider server can filter the attack flow in different intensity by reducing a quantity of virtual machines in the second cleaning center or by reducing the filtration conditions.

In another embodiment, the botnet service provider server adjusts a quantity of the second flow rules according to the classification level of the attack flow or reduces the network device, for which the second SDN controller is responsible for in the botnet service provider server, according to the classification level of the attack flow.

In one embodiment, the method further includes: the target service provider server sends a registration signal carrying an identity information of the target service provider server to the platform server to register the target service provider server according to the identity information of the target service provider server in the platform server; and the platform server receives the first registration signal, registers the target service provider server according to the identity information of the target service provider server contained in the first registration signal to grant the target service provider server permission to exchange an attack information.

In the embodiment, the target service provider server sends the registration signal carrying the identity information of the target service provider server to the platform server by a first communication unit. The identity information of the target service provider server can be an unique numbering information of the target service provider server, and the numbering information can be composed of characters such as letters or numbers.

In one embodiment, the method further includes: the botnet service provider server sends the registration signal carrying the identity information of the botnet service provider server to the platform server to register the botnet service provider server according to the identity information described in the platform server; and the platform server receives the second registration signal, and registers the botnet service provider server according to the identity information of the botnet service provider server contained in the second registration signal to grant the botnet service provider server permission to exchange an attack information.

In one embodiment, the platform server registers the target service provider server or the botnet service provider server in the permissions list according to the identity information of the target service provider server or the identity information of the botnet service provider server, to grant the target service provider server or the botnet service provider server the permission to exchange the attack information. In the embodiment, the permissions list is stored in the platform server.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A method for preventing distributed denial of service attack, applied in a target service provider server, a platform server, and a botnet service provider server, the method comprising:
the target service provider server receiving an attack protection request sent by an enterprise network;
the target service provider server determining a first Software Defined Network (SDN) controller in the target service provider server according to the attack protection request, and issuing a first redirect notification to the first SDN controller, and controlling the first SDN controller to convert the first redirected notification into a first flow rule;
the target service provider server directing a data flow of a network equipment in the enterprise network to a first cleaning center of the target service provider server and controlling the first cleaning center to identify an attack flow from the data flow according to the first flow rule;
the target service provider server sending the identified attack flow to the platform server;
the platform server receiving the attack flow sent by the target service provider server, and regarding the received attack flow as a malicious traffic; and
the platform server determining a botnet service provider server containing the malicious traffic in a permission list stored in the platform server, generating an attack report, and sending the attack report to the botnet service provider server to notify the botnet service provider server to clean or filter the malicious traffic.

2. The method as recited in claim 1, further comprising:
the botnet network service provider server receiving the attack report sent by the platform server, determining which second SDN controller is associated with the botnet service provider server according to the attack report, issuing a second redirect notification to the associated second SDN controller;
the botnet network service provider server controlling the associated second SDN controller to convert the second redirect notification into a second flow rule; and
the botnet service provider server directing the data flow of the network device in the botnet service provider server to a second cleaning center of the botnet service provider server according to the second flow rule, and controlling the second cleaning center to identify the attack flow from the data flow.

3. The method as recited in claim 2, wherein the first flow rule is a data forwarding rule directing the data flow in the network equipment of the enterprise network to the first cleaning center in the target service provider server.

4. The method as recited in claim 2, wherein the second flow rule is a data forwarding rule directing the data flow of the network device in the botnet network to the second cleaning center.

5. The method as recited in claim 2, further comprising:
the target service provider server querying the attack flow of the botnet network service provider by the first SDN controller for each preset cycle, and sending the attack flow to the platform server;
the platform server classifying the attack flow according to quantity of the attack flow sent by the target service provider server to obtain a classification level of the attack flow, and sending the classification level of the attack traffic to the botnet service provider server; and
the botnet service provider server receiving the classification level of the attack flow sent by the platform server, and cleaning the attack flow according to the classification level of the attack flow.

6. The method as recited in claim 5, further comprising:
the platform server defining the attack flow above a first preset threshold as a first hazard level, defining the attack flow above a second preset threshold as a second hazard level, and defining the attack flow above a third preset threshold as a third hazard level, wherein the first preset threshold is 100 Gbps, the second preset threshold is 50 Gbps, and the third preset threshold is 25 Gbps.

7. The method as recited in claim 5, wherein the botnet service provider server filters the attack flow in different intensity by reducing a quantity of virtual machines in the second cleaning center.

8. The method as recited in claim 5, wherein the botnet service provider server adjusts a quantity of the second flow rules according to the classification level of the attack flow or reduces the network device, for which the second SDN controller is responsible in the botnet service provider server, according to the classification level of the attack flow.

9. The method as recited in claim 2, further comprising:
the target service provider server sending a registration signal carrying an identity information of the target service provider server to the platform server to register the target service provider server according to the identity information of the target service provider server in the platform server; and
the platform server receiving the first registration signal, registering the target service provider server according to the identity information of the target service provider server contained in the first registration signal to grant the target service provider server permission to exchange an attack information.

10. The method as recited in claim 2, further comprising:
the botnet service provider server sending the registration signal carrying the identity information of the botnet service provider server to the platform server to register the botnet service provider server according to the identity information described in the platform server; and
the platform server receiving the second registration signal, and registering the botnet service provider server according to the identity information of the botnet service provider server contained in the second registration signal to grant the botnet service provider server permission to exchange an attack information.

11. A botnet network service provider server, comprising:
a third communication unit configured to communicating with a platform server;
a fourth communicating unit configured to communicating with a botnet network;
at least one second Software Defined Network (SDN) controller;
a second cleaning center;
a processing unit coupled to the third communication unit, the fourth communicating unit, the at least one second SDN controller, and the second cleaning center;
a non-transitory storage medium coupled to the processing unit and configured to store a plurality of instructions, which causes the botnet network service provider server to:
the platform server receiving the attack flow sent by the target service provider server, and regarding the received attack flow as a malicious traffic; and
the platform server determining a botnet service provider server containing the malicious traffic in a permission list stored in the platform server, generating an attack report, and sending the attack report to the botnet service provider server to notify the botnet service provider server to clean or filter the malicious traffic;
receive an attack report sent by the platform server, determine which second SDN controller is associated with the botnet service provider server according to the attack report, and issue a second redirect notification to the associated second SDN controller;
control the associated second SDN controller to convert the second redirect notification into a second flow rule; and
direct a data flow of the network device in the botnet service provider server to the second cleaning center according to the second flow rule, and control the second cleaning center to identify the attack flow from the data flow.

12. The botnet network service provider server as recited in claim 11, the plurality of instructions is further configured to cause the botnet network service provider server to receive a classification level of the attack flow sent by the platform server, and clean the attack flow according to the classification level of the attack flow.

13. The botnet network service provider server as recited in claim 12, the plurality of instructions is further configured to cause the botnet network service provider server to filter the attack flow in different intensity by reducing a quantity of virtual machines in the second cleaning center.

14. The botnet network service provider server as recited in claim 12, the plurality of instructions is further configured to cause the botnet network service provider server to adjust a quantity of the second flow rules according to the classification level of the attack flow or reduces the network device, for which the second SDN controller is responsible for in the botnet service provider server, according to the classification level of the attack flow.

* * * * *